(Model.)

A. O. CARMAN.
GRAIN BINDING HARVESTER.

No. 318,953. Patented June 2, 1885.

7 Sheets—Sheet 1.

WITNESSES
Jas. E. Hutchinson.
S. G. Nottingham.

INVENTOR
Alvin O. Carman
By H. A. Seymour
Attorney (Model.)
7 Sheets—Sheet 2.
A. O. CARMAN.
GRAIN BINDING HARVESTER.
No. 318,953.
Patented June 2, 1885.
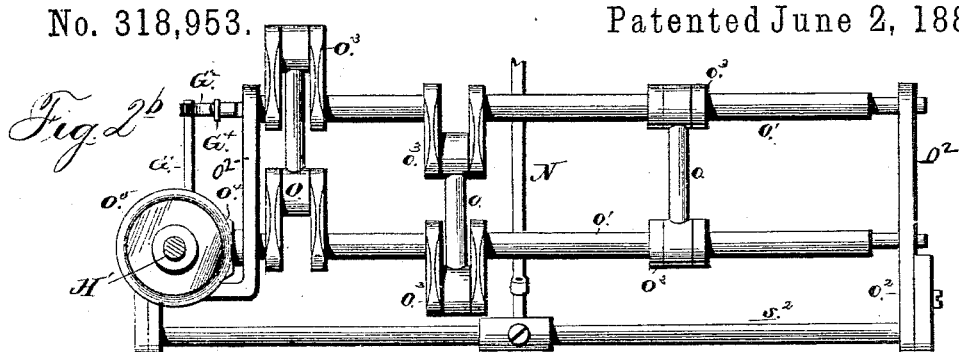
Fig. 2ᵇ
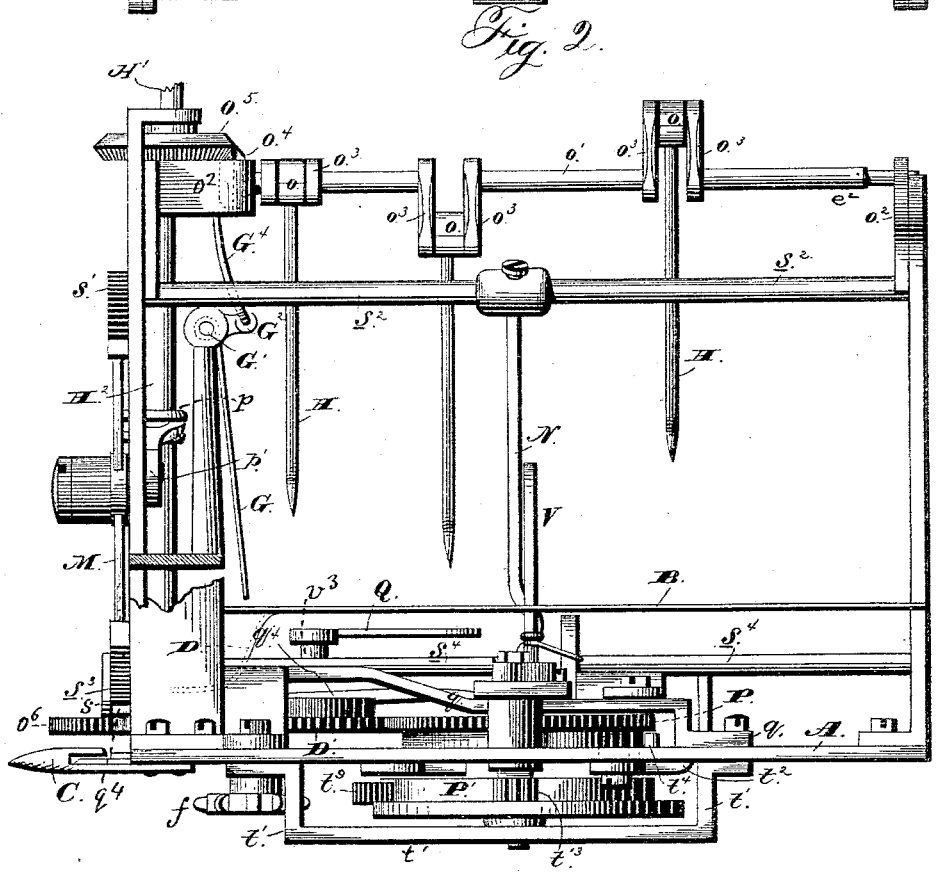
Fig. 2.
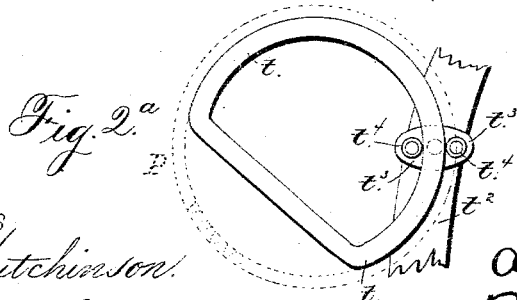
Fig. 2ᵃ
WITNESSES
Jas. E. Hutchinson
S. G. Nottingham
INVENTOR
Alvin O. Carman
By H. A. Seymour
Attorney (Model.)

A. O. CARMAN.
GRAIN BINDING HARVESTER.

No. 318,953. Patented June 2, 1885.

7 Sheets—Sheet 3.

WITNESSES
Jas. E. Hutchinson.
S. G. Nottingham.

INVENTOR
Alvin O. Carman
By H. A. Seymour
Attorney

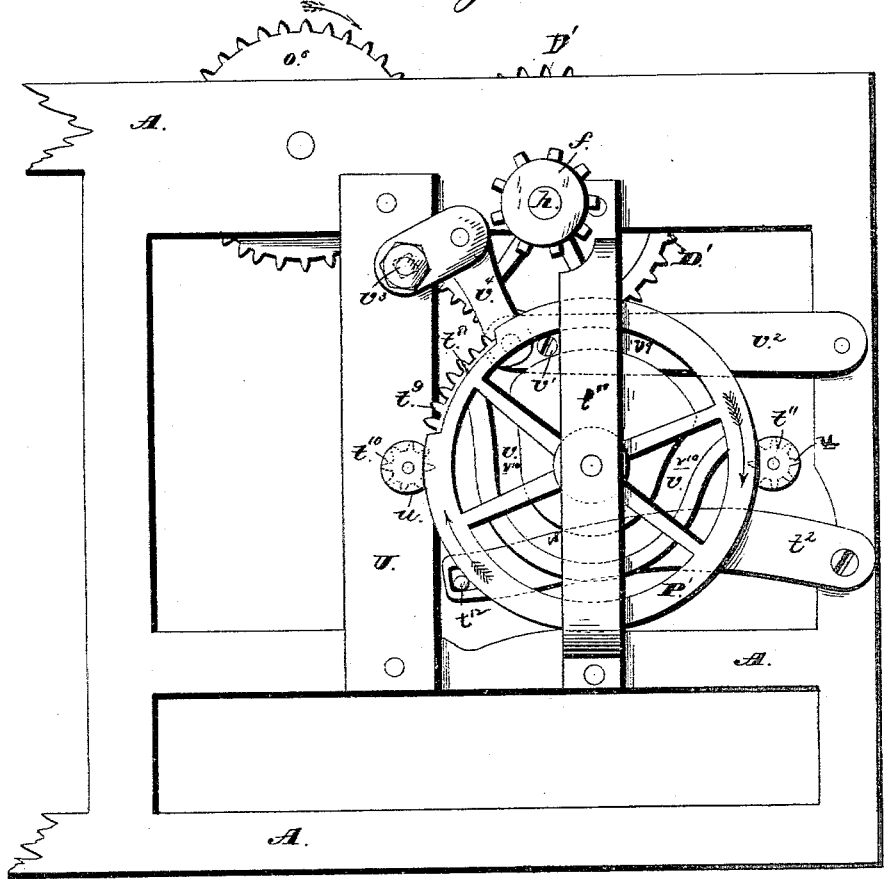

(Model.)
A. O. CARMAN.
GRAIN BINDING HARVESTER.
No. 318,953. Patented June 2, 1885.
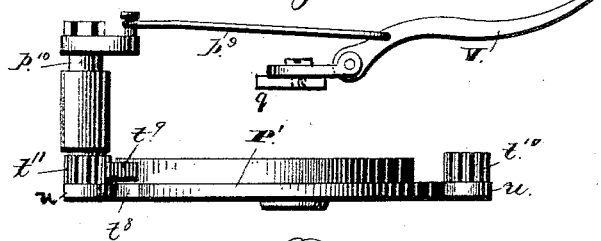
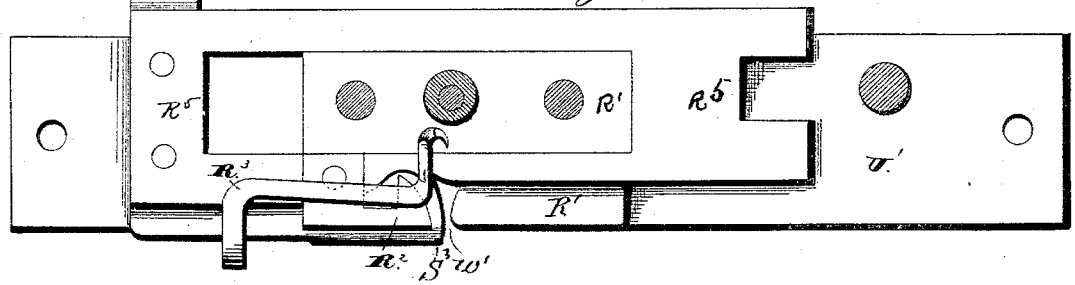
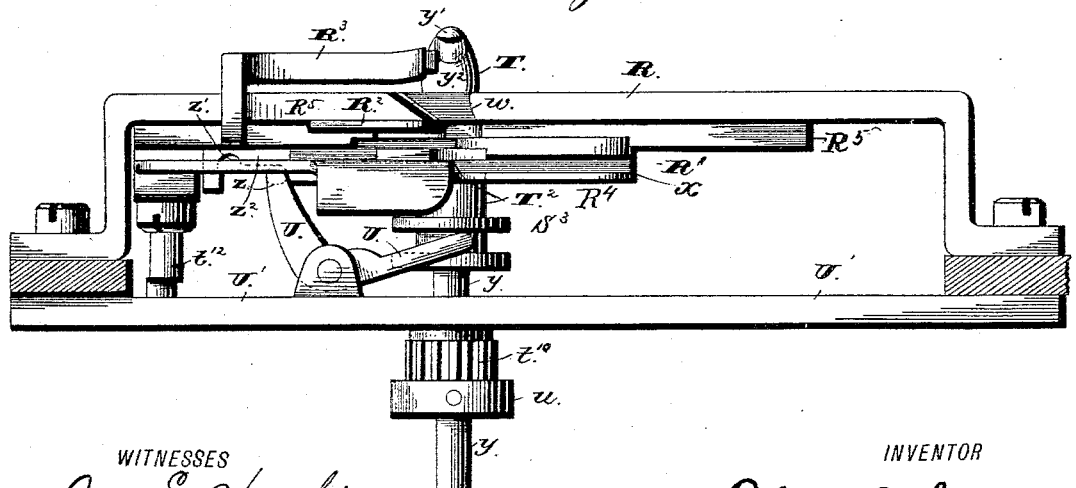
WITNESSES
Jas. E. Hutchinson
S. G. Nottingham
INVENTOR
Alvin O. Carman
By H. A. Seymour
Attorney (Model.)
A. O. CARMAN.
GRAIN BINDING HARVESTER.
No. 318,953. Patented June 2, 1885.
7 Sheets—Sheet 6.
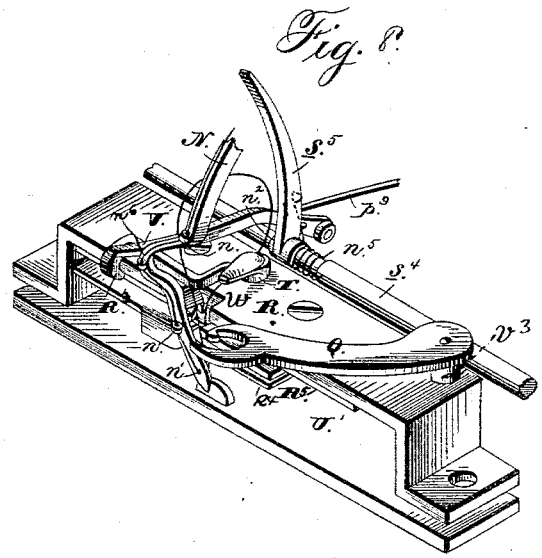
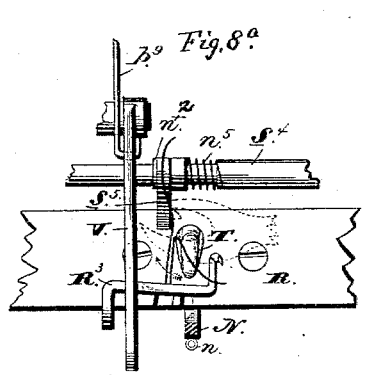
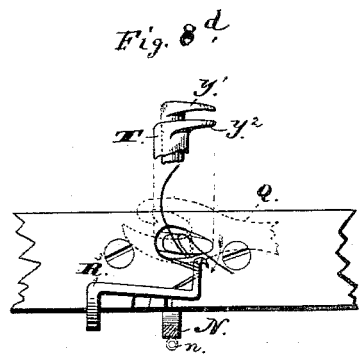
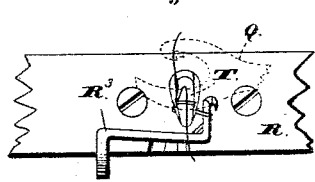
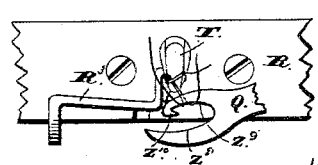

(Model.)

A. O. CARMAN.
GRAIN BINDING HARVESTER.

No. 318,953.

7 Sheets—Sheet 7.

Patented June 2, 1885.

WITNESSES
Jas. E. Hutchinson.
S. G. Nottingham.

INVENTOR
Alvin O. Carman
By H. A. Seymour
Attorney

UNITED STATES PATENT OFFICE.

ALVIN O. CARMAN, OF POTTERVILLE, MICHIGAN.

GRAIN-BINDING HARVESTER.

SPECIFICATION forming part of Letters Patent No. 318,953, dated June 2, 1885.

Application filed May 3, 1883. (Model.)

*To all whom it may concern:*

Be it known that I, ALVIN O. CARMAN, of Potterville, in the county of Eaton and State of Michigan, have invented certain new and useful Improvements in Grain-Binding Harvesters; and I do hereby declare the following to be a full, clear, and exact description of the invention, such as will enable others skilled in the art to which it appertains to make and use the same.

My invention relates to an improvement in grain-binding harvesters, the object of the same being to provide a device of comparatively few parts, that will combine economy in construction with durability and efficiency in use; and with these ends in view my invention consists in the parts as will be more fully described and pointed out in the claims.

Figure 1:
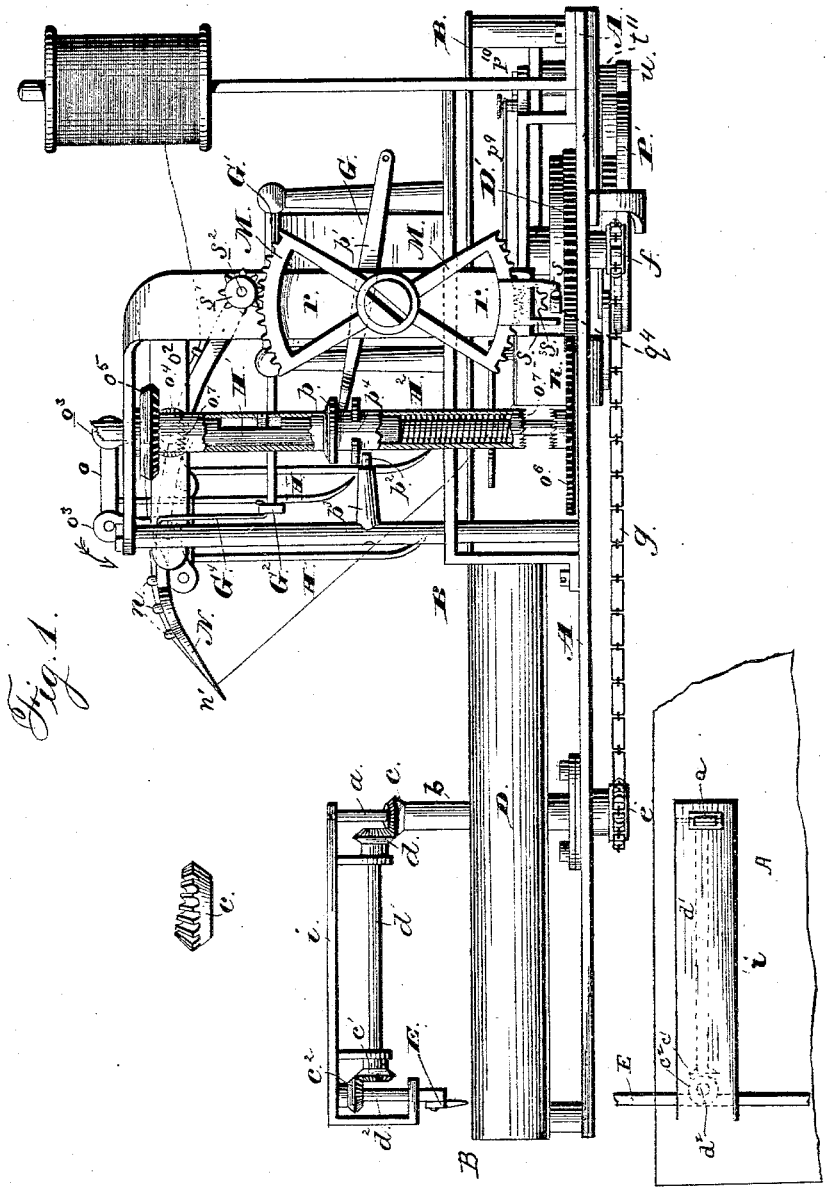
Figure 3:
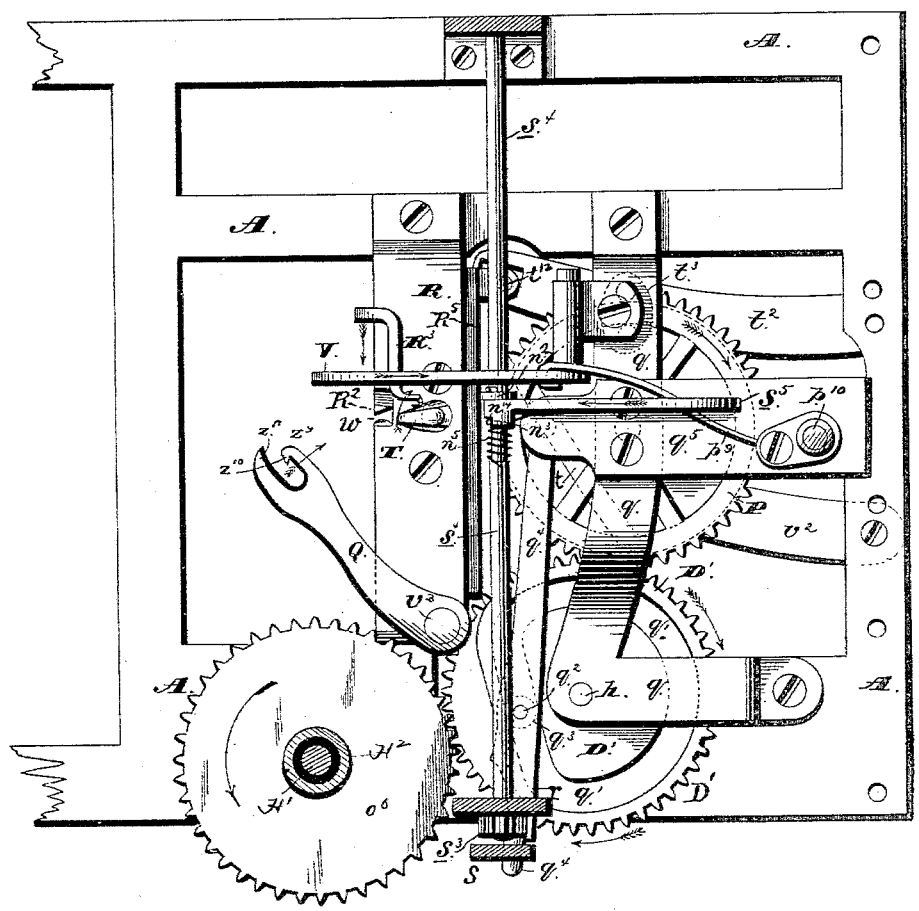
Figure 9:
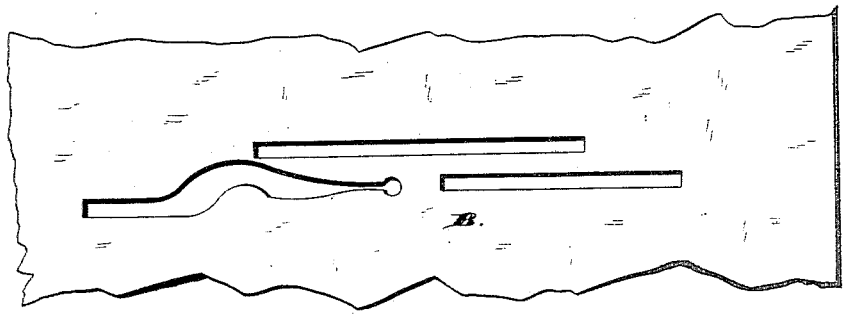
Figure 10:
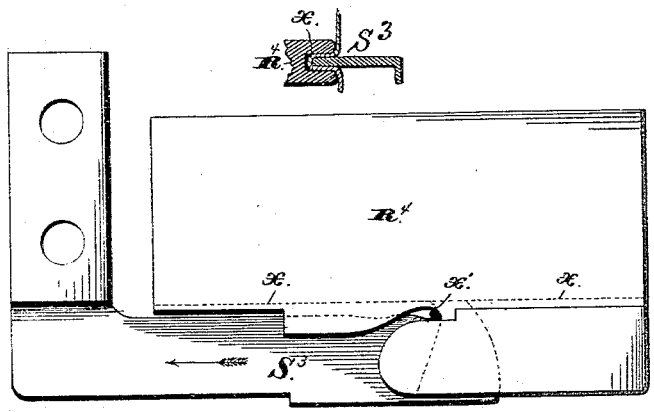
Figure 11:

In the accompanying drawings, Figure 1 is a view in front elevation. Fig. 2 is a side view looking from the stubble side. Fig. $2^a$ is a detached view showing the manner of connecting the lever $t^2$ to the wheel P. Fig. $2^b$ is a plan view of the packers and packer-operating shafts. Fig. 3 is a top plan view of a portion of the machine-frame and operative mechanism. Fig. 4 is a bottom plan view of the same. Fig. 5 is a detached rear elevation, showing mechanism for operating the ejector and tying-bill. Fig. 6 is a plan view of the holding and cutting mechanism, the upper plate being removed. Fig. 7 is a side elevation of the holding, cutting, and knot-tying mechanism. Fig. 8 is a perspective view; Figs. $8^a$, $8^b$, and $8^c$, detail plan views, and Fig. $8^d$ a detail elevation, showing the relative position of the several parts of the knot-tying mechanism during the operation of tying a knot. Fig. 9 is a plan view of a portion of the table or platform, showing the oblong openings for the passage of the needle, ejector, and compressor-arm. Fig. 10 shows in section and in plan the manner of holding the end of the binding-cord, and Fig. 11 is a modified form of ejector.

A represents the rectangular frame of the machine adapted to be supported on wheels from which the necessary power for the operative parts is obtained in any desired manner. This frame and the operative parts of the tying mechanism are covered and protected by the platform B, a portion of which can, if so desired, be an endless apron, for the purpose of delivering the grain to one end of the machine, where it is bound into bundles. This platform, however, in the present instance is immovable, and the grain, as it falls thereon, remains stationary until the horizontally-rotating rake E moves it sidewise toward the end of the machine, where the binding mechanism is located. This rake is geared with the other operative parts of the machine, as will be hereinafter described, and its movement is consequently dependent on the movement of the machine. If the harvester is moving rapidly the rake moves at a corresponding rate of speed, and delivers the cut grain in even and uniform bundles to the binding mechanism.

The rake-shaft $a$ is supported and held in position within the hollow sleeve $b$, which latter is rigidly secured in any desired manner to the frame A. This sleeve $b$ is provided at its upper end with a bevel-wheel, $c$, with which the bevel-wheel $d$ on the revolving shaft $d'$ meshes. The shaft $a$ projects above and below the sleeve $b$, and is provided at its lower end under the platform with the chain-wheel $e$. Motion is transmitted to the shaft $a$ from the chain-wheel $f$ through the intervention of the endless drive-chain $g$. The chain-wheel $f$ is rigidly secured to the lower end of the shaft $h$ of the cam-wheel D', and has its motion imparted from said cam-wheel. The upper end of the shaft $a$ has pivotally secured thereto the frame $i$, the pivot allowing only a vertical movement of said frame, which latter carries the horizontal shaft $d'$ and the vertical shaft $d^2$, the said latter shafts $d'$ and $d^2$ being geared together by the bevel-wheels $c'$ $c^2$.

From the foregoing it will be seen that as the shaft $a$ is turned the frame $i$ will be moved in the same direction, and carry the rake E, secured to the lower end of the vertical shaft $d'$, over the platform and deliver the grain to the binding mechanism.

The sleeve $b$, as before stated, is rigidly secured to the frame of the machine, and is provided at its upper end with the bevel-wheel $c$, rigidly secured thereto. This bevel-wheel is cam-shaped—that is to say, the teeth on the outside thereof are higher than the teeth on the inside—and the wheel $d$ on the shaft $d'$ is similarly shaped, and so geared with the wheel $c$ that when the rake is passing over the platform it is in its lowest position, and as it nears the rear edge of the machine rises up above the bundle, and is held in this elevated position until it turns onto the table. The rotary motion of the shafts $d'$ and $d^2$, their actuating gearing being in the proper proportion, holds the rake at right angles to the cutter-bar as it swings about the axis of the shaft $a$, and consequently causes the same to deliver the grain to the binding mechanism, instead of sweeping it off at the rear of the table, as it would if the rake were rigidly secured to the frame $i$. This rake is so geared with the tying mechanism that when it delivers the grain thereto the needle will be elevated and the ejector depressed, so as to enable the grain to be moved outward and rest upon said ejector and directly over the knot-tyer.

The packers H and the other operative parts of the machine are operated by the vertical shaft H′, situated at the inner side of the cutting apparatus and driven from the harvester, and are so connected to the said shaft, as will be hereinafter described, that while they are operating to pack the grain against the binding-cord and compressor-arm the other parts are at rest, and while the other parts are operating the packers are at rest. These packers are preferably made of metal with curved lower ends, and are secured at their upper ends to the links $o$, which connect the cranks of two shafts, $o'$. These parallel crank-shafts $o'$ are supported in a suitable frame, $o^2$, elevated considerably above the platform, and are each provided with any suitable number of registering-cranks, $o^3$, to which the links $o$ are pivotally connected. The forward end of one shaft, $o'$, is provided with a bevel-wheel, $o^4$, which meshes with the bevel-wheel $o^5$, loosely secured on the shaft H′ near its upper end. When the motion of the shaft H′ is transmitted to the bevel-wheel $o^5$, the crank-shafts $o'$ are turned simultaneously, and the depending packers or fingers secured to the links are either simultaneously or alternately caused to descend and force the grain back against the binding-cord and compressor-arm, then rise above the grain, advance, and again descend, and so on until they are thrown out of gear, when the motion is taken up by the parts in gear with the lower end of the shaft H′. These packers always stand in a vertical position and at right angles to the platform, and consequently perform their functions in a much more satisfactory manner than the ordinary inclined packers. The shaft H′ is provided at its lower end with the loose pinion $o^6$, which latter drives the binding mechanism. This pinion $o^6$ is the same size as the cam-wheel D′, and meshes therewith, and is adapted to be turned with the shaft H′ when the bevel-wheel $o^5$ on the opposite end of the shaft is disengaged therefrom. By making the pinion $o^6$ and the cam-wheel D′ of the same size, the cam-wheel D′ is consequently revolved once at each revolution of the pinion, which is sufficient to tie and cut the cord.

Between the wheels $o^5$ and $o^6$ on the shaft H′ the sleeve H² is situated. This sleeve is splined to the shaft so as to revolve therewith and yet move up and down thereon, and is provided at its opposite ends with the teeth $o^7$, adapted to respectively engage the teeth formed on the inner ends of the hubs of the wheels $o^5$ and $o^6$, so as to turn one or the other of said wheels when the machine is in operation. This sleeve is provided centrally with a rigid collar, $p$, in the groove of which latter the bifurcated end of the lever $p'$ works. A coil-spring is wound around the shaft H′ inside of the sleeve H², one end of the same being rigidly secured to the shaft H′, while the opposite end thereof is secured to the inside of the sleeve H². The tendency of this spring is to keep the sleeve up in contact with the bevel-wheel $o^5$, but this tendency is overcome by the lever $p'$, which can be operated by the driver or by suitable automatic trip mechanism. The shaft H′ is driven by the harvester. When the machine is in operation, said shaft revolves constantly, and either the packers or the binding mechanism is always in motion.

To operate the binding mechanism the bifurcated lever $p'$ is moved in the proper direction by the driver or by the trip mechanism before referred to, and the sleeve H² moved downward until the friction-roller $p^2$ on the outer end of the finger $p^3$ enters the cut-away portion $p^4$ in the lower ring of the collar $p$. By the rotation of the sleeve H² the roller $p^2$ is held above the lower ring of the collar until the shaft H′ has made one complete revolution and the cut-away portion $p^4$ again reaches said roller, when the sleeve H² moves upward and engages the bevel-wheel $o^5$. During the revolution of the shaft H′, when the sleeve H² is in its depressed position, the knot is tied, cut, and the gavel swept from the table.

The cam-wheel D′ is journaled in the machine-frame A, and the upper end of the shaft thereof is held in position by the brace $q$, the lower end thereof below the frame A being provided with the chain-wheel $f$, which operates the rake E, as above stated. The wheel D′ is provided on its upper face with a cam-groove, $q'$, as shown in Fig. 3, in which the pin $q^2$, having the friction-roller $q^3$ thereon, rests and moves. This pin is secured to the lower face of the vibrating-lever $q^4$, the rear end of which is pivotally secured to the arm $q^5$, while the front end vibrates the double or hour-glass-shaped sector-wheel M, pivotally secured to the standard $r$. The cam-groove $q'$ is circular throughout its greater portion, while the remaining portion thereof is straight. During the movement of the wheel D′ when the roller $q^2$ is in the circular portion of the groove $q'$ the lever $q^4$ remains at rest; but when the roller reaches the straight portion of the said groove its outer end is first moved in one direction, and then back again to its original position, where it remains until the wheel D′ is again turned by the shaft H′. The outer end of the lever $q^4$ rests between the depending fingers $s$ of the double sector-wheel M, and as the lever is vibrated the double sector-wheel is also moved to correspond therewith. The upper toothed portion of the double sector M meshes with the small pinion $s'$, rigidly secured to the horizontal needle-shaft $s^2$, while the lower toothed portion of the said double sector meshes with the small pinion $s^3$, rigidly secured to the shaft $s^4$, to which latter the compressor-arm $s^5$ is journaled. The needle projects inwardly from the shaft $s^2$, while the compressor-arm projects outwardly from the shaft $s^4$, and hence it will be seen that when the double sector M is turned the needle is lowered toward the compressor-arm and the compressor-arm elevated toward the needle, and when the double sector M is turned in the opposite direction the needle is elevated and the compressor-arm lowered beneath the platform. I can, if desired, dispense with the double sector and provide the needle and compressor-arm shafts with cranks and connect the two by a pitman. Thus it will be seen that when motion is imparted to the compressor-arm shaft by suitable gearing it will transmit the motion to the needle-shaft and operate it simultaneously therewith. The needle N is slightly curved, as shown in the drawings, and is provided with the loops $n$ and the eye $n'$, through which the binding-cord passes.

The needle is bent transversely or turned to one side, as shown at $n^6$, to enable the cord-guiding arm Q to pass the needle and grasp the cord and hold it in position for the knot-tyer.

The shaft $s^4$ is provided about midway its length with the collar $n^2$, against which one end of the hub of the compressor-arm $s^5$ bears. The opposite end of the hub is provided with a laterally-projecting shoulder, $n^3$, adapted to abut against the pin $n^4$, which latter limits the forward movement of the compressor-arm. The shaft $s^4$ is encircled by the spiral spring $n^5$, the forward end of which is rigidly secured to said shaft, while the rear end is secured to the hub of the compressor-arm and tends to hold the shoulder $n^3$ against the pin $n^4$. Thus it will be seen that when the compressor-arm is moved against the grain it yields on the shaft and accommodates itself to the thickness of the gavel.

The wheel D' meshes with the wheel P, which is provided on its lower face with a cam-ring, T-shaped, like the cam-groove in the wheel D', and adapted to operate the cord holding and cutting mechanism. This wheel is journaled in the arm $q$ and the bearing-piece $t'$, which latter supports the said wheel and assists in bracing the machine-frame. This wheel operates the cord holding and cutting mechanism through the intervention of the lever $t^2$, the outer end of which is pivotally secured to the machine-frame, while the inner end is connected to the depending finger $t^{12}$ of the cord holding and cutting mechanism R$^5$. The lever $t^2$ is provided on its upper face near its inner end with the plate $t^3$, (see Figs 2$^a$ and 3,) pivotally secured thereto, and which supports the friction-rollers $t^4$. These two rollers move on opposite sides of the cam-ring $t$, and hence it will be seen that when the wheel P is turned the inner end of the lever $t^2$ is held stationary so long as the rollers $t^4$ engage with the circular portion of the cam $t$, but just as soon as the straight portion thereof engages the rollers the lever is moved first forward, where it remains a few seconds, and then rearward, during which movement the cord has been tied and cut, and the end of the string grasped and held in position to form an abutment for the next bundle.

Below the wheel P, and rigidly secured to the shaft thereof, is the wheel P', the function of which is to revolve the knot-tyer shaft and operate the cord-guiding arm and ejector. This wheel P' is provided with a plain periphery throughout the greater portion thereof, while the remaining portion, $t^8$, is cut away so as to allow the holding-blocks or delay-surfaces $u$ on the knot-tyer shaft $y$ and the shaft $p^{10}$, which operates the ejector, to turn at the proper time. The wheel P' is provided above the cut-away portion $t^8$ with the rack $t^9$, for the purpose of engaging the pinions $t^{10}$ and $t^{11}$ secured, respectively, to the knot-tyer shaft $y$ and the ejector-shaft $p^{10}$ above the holding-blocks $u$. Thus it will be seen that when the wheel P' is revolved both the blocks bear against the smooth periphery thereof until the cut-away portion is reached, when the pinion above the shoe is revolved once only and is again locked against movement. The wheel P' then continues its revolution with both of the holding-blocks locked until it makes a half-turn, when the other pinion engages the rack and is also turned once.

The wheel P' is provided on its top face with the cam-groove $v$, in which the roller $v'$ on the lever $v^2$ works. This lever is pivoted at its outer end to the machine-frame and is connected to the lower cranked end of the cord-guiding-arm shaft $v^3$ by the connecting-link $v^4$. The shaft $v^3$ passes upward and is provided at its upper end with the cord-guiding arm Q, which latter will be referred to later on. The cam-groove $v$ is at two diametrically-opposite points formed concentric with the axis of the wheel, one concentric portion, $v^8$, being near the axis of the wheel, and the other, $v^9$, near the periphery thereof, the two concentric portions of the said groove being joined by eccentric or reversely-curved grooves $v^{10}$, which are also diametrically opposite each other. Suppose, for the sake of illustration, that the roller $v'$ has just entered the concentric portion $v^8$ of the cam-groove $v$, near the axis of the wheel, and the wheel P' is in motion, then the arm Q will remain at rest away from the cord-tyer, or in a position to grasp the cord after the descent of the needle, as long as the roller $v'$ is in said portion, $v^8$, of the cam-groove $v$. As soon as the roller $v'$ enters one of the eccentric portions $v^{10}$ of the cam-groove the lever $v^2$ is moved, and the arm Q turned inwardly over and behind the knot-tyer, where it remains as long as the roller $v'$ is in the concentric portion $v^3$ of the cam-groove near the periphery of the wheel P'.

R is a plate secured to the frame of the machine under the platform, and provided with an opening for the passage of the knot-tyer shaft $y$ and with a slot, $w$, one side wall of which is beveled or sharpened and acts in conjunction with a sliding cutter, $R^2$, to cut the cord. This upper plate, R, which forms a part of the cord-cutting mechanism, is rigidly held in place and is provided with a second plate, R', rigidly secured to the lower face thereof, leaving a space between the two for the purpose of forming a guide for the knife $R^2$ of the cord-cutter, which latter is rigidly secured to the sliding plate $R^5$. This plate $R^5$ is provided at one side with the depending finger $t^{12}$, which latter engages the lever $t^2$, and is moved thereby, as previously stated. The blade $R^2$ of the cord-cutter is L-shaped. It moves under the rigid blade on the plate R and is provided with a rounded or inwardly-curved end, around which the cord slides until it rests between its cutting-edge and the cutting-edge of the rigid blade. The sliding plate $R^5$ is also provided with the finger $R^3$, which latter is curved over above the plate R and is adapted to move the cord under the tying-bill during or just previous to the revolution of said bill.

The lower rigid plate, $R^4$, which is a part of the plate R', is provided on its front edge with a longitudinal groove, $x$, in which the cord-holding jaw $S^3$ slides. This holder is rigidly secured to the sliding plate $R^5$ below the cutter-blade $R^2$, and is provided at its front inner end with a V-shaped notch, $x'$, in which the cord passes when the jaw $S^3$ is moved to an open position.

When the parts are to be opened the blade $R^2$ and the jaw $S^3$ are moved to the left, as represented in Figs. 6, 7, and 8, and from under the open slot $w$ in the upper plate, R, leaving a free passage for the binding-cord down through the slot in the plate $R^4$. When the needle has descended and carried the cord over the gavel, the passage-way is open and the cord-guiding arm Q is turned and carries the cord into the vertical passage-way through the plates R, R', $R^4$, and $R^5$. After the cord has entered the passage-way the plate $R^5$ is moved in the proper direction, and the cord-holding jaw $S^3$ will pass over the cord and confine it between said jaw and the plate $R^4$. When the plate $R^5$ is moved backward to a closed position, the cord above the holding-jaw is severed and leaves the gavel free to be ejected, while the end of the cord below the cutting-knife is retained by the holding-jaw for the next gavel.

The knot-tyer T is composed of a shaft, $y$, to the lower end of which is rigidly secured the block or delay-shoe $u$ and the pinion $t^{10}$, which latter engages with the rack $t^9$ on the wheel P', before referred to, and the sleeve $T^2$, free to move longitudinally on the shaft $y$, but retained against rotary motion thereon. The shaft $y$ is provided at its upper end with a jaw, $y'$, and the sleeve $T^2$ is provided with a jaw, $y^2$, adapted to register with the jaw $y'$, for the purpose of holding the cord between them. The lower end of the sleeve $T^2$ is provided with a grooved collar in which the bifurcated end of the bell-crank U rests. This bell-crank is pivotally secured to the plate U', through which the tying-shaft passes, and is provided at its upper end with a laterally-projecting finger, $z$, which latter works in the open slot or recess $z'$ of the downwardly-projecting flange $z^2$ of the plate $R^5$. This slot is provided at its rear or outer end with an upward continuation, into which the finger $z$ of the bell-crank U is forced as the plate $R^5$ is moved forward. This upward continuation of the slot $z'$ is made curved, so as to enable the finger $z$ to easily enter and pass therefrom without hitch during the operation of the machine. From the foregoing it will be seen that when the finger $z$ of the bell-crank remains in the main or horizontal portion of the slot $z'$ the bell-crank will remain at rest, and the lower jaw, $y^2$, on the sleeve $T^2$ will rest up against the jaw $y'$ of the tyer-shaft. As soon, however, as the outer end of the slot is reached the finger $z$ abuts against the outer wall thereof and is forced up into the upward continuation of the slot. This movement of the bell-crank lowers the sleeve on the tying-shaft, and consequently separates the jaws of the tyer. After the cord has been formed into a loop around the jaws of the tyer, the loop rests on the upper edge of the sleeve $T^2$, and as the latter is elevated (which movement closes the jaws of the knot-tyer) it carries the loop upward to the top of the upper tying-jaw, so as to enable it to be withdrawn from the bill by the cord-guiding arm without hitch or danger of breaking the cord.

The ejector V is pivoted to the machine-frame or to the transverse bearing-piece over the wheel P, and is connected by a link, $p^9$, to a crank-arm or shaft $p^{10}$, which latter, like the cord-tyer, is operated by the rack $t^9$ on the wheel P', as before stated. This ejector rests under the platform, and is elevated after the bundle is tied by the movement of the shaft $p^{10}$. After the pinion $t^{11}$ on the shaft $p^{10}$ has been turned once, the block or delay-shoe $u$ on the lower end of said shaft engages with the smooth periphery of the cam-wheel P' and holds the shaft against all further movement until the rack on the said wheel again engages the pinion.

Instead of making the ejector of a single arm, as shown, it can be made to perform the functions of an abutment for the grain and an ejector to discharge the gavel after it has been bound. This modified form is shown in Fig. 11, and consists simply of a second arm rigidly secured to the ejector-arm at right angles thereto. When the ejector-arm is down under the platform, the second arm is elevated, or in a vertical position, and forms an abutment against which the grain is pressed during the operation of binding. After the bundle is tied the ejector is brought up to a vertical position and ejects the bundle, and the second arm is depressed or moved to a horizontal position. As soon as the bundle is ejected the ejector-arm falls, and the arm which forms the abutment is elevated to a vertical position and bars the progress of the grain until it is tied.

The cord-guiding arm Q rests in a horizontal position and is adapted to carry the cord within reach of the knot-tyer. This arm is operated as previously described, and is provided at its outer end with two fingers, $z^8$ and $z^9$. The outer finger, $z^8$, is provided with a curved outer face, and is longer than the finger $z^9$, so as to enable it to engage the cord while moving toward the knot-tyer. After the cord has been engaged by the arm Q it remains between the two fingers $z^8$ $z^9$ until the knot has been tied, when the arm Q begins to move outward. As the arm moves outward or away from the knot-tyer, the inner finger, $z^9$, engages the cord. This finger is provided on its inner face at its outer end with a hook, $z^{10}$, which prevents the cord from sliding off the said finger until the cord has been disengaged from the jaws of the knot-tyer. After the bundle has been tied the arm Q, by the mechanism before referred to, begins to move outward. This arm being between the gavel and the knot-tyer consequently engages the cord above the knot, and as it moves outward it withdraws the ends of the string from between the tying-jaws and leaves the gavel free to be moved from the platform.

The needle is threaded by first passing the cord through the eye, which latter, when the needle is down, rests below the tying mechanism. The free end of the cord is then carried upward through the vertical passage formed by the stationary and movable plates of the cord holding and cutting mechanism, and the cord-holding jaw $S^3$ is brought to an open position, which causes the free end of the cord to enter the V-shaped notch $x'$. The cord-holding jaw is then moved backward to a closed position and confines the free end of the cord between it and its guiding-plate. The needle is now raised to its highest position and the parts are in condition for binding. The grain as it falls onto the platform remains stationary until taken up by the rake, which deposits it within easy reach of the packers. This rake only moves when the binding mechanism is in motion, and hence it deposits the grain regularly and evenly under the packers.

The tying mechanism now ceases, and the packers, which begin to move as soon as the rake and binding mechanism stop, pack the grain against the binding-cord, while the butting-board G, rigidly secured to the rocking bar G', moves inwardly at regular intervals, and, striking the butts of the grain, moves the projecting ends rearwardly or longitudinally, which assists materially in the formation of neat and uniform gavels. The outer end of the rocking bar G' is provided with a crank, $G^2$, which latter is connected to the crank $G^3$ on one of the cranked packer-shafts by the pitman $G^4$, and is consequently moved simultaneously with the said packers. After the grain has been packed sufficiently, the packers are thrown out of gear and the binding mechanism started, which causes the needle to descend and carry the cord over the bundle of grain. The compressor-arm ascends and holds the bundle in position. The arm Q now moves inward, and the finger $z^8$ seizes the cord and carries it to the left, beyond the knot-tyer and slightly behind the same. At this juncture the movable portions $R^5$ and connecting parts of the cord holding and cutting mechanism are moved forward, and the finger $R^3$ forces the cord under the tying bill or jaws, where it holds it until the tying-bill makes one revolution and the lower jaw descends. As the tying-bill turns in the direction indicated by the arrows it engages the cord, which has been held in position by the arm Q, and turns it once around the said bill, thus forming a loop. By this time the tyer has reached the portion of the cord held by the finger $R^3$, and passes onward until it stops in the position from which it started, with the horizontal portion of the cord held by the finger $R^3$ between its jaws. The lower jaw then ascends and grasps the cord, and simultaneous with the movement the cutters sever the cord. The arm Q now moves to its former position and draws the loop of the cord over the tying-jaws, the ends being still held between the said jaws until the knot is tightened, which is performed by the outward movement of the arm Q. This arm still continues to move, and finally withdraws the cord from between the tying-jaws and leaves the gavel free to be ejected. The outer end of the main body of the cord is still held firmly by the cord-holding jaw below the cutters, and as the needle ascends the cord is unwound from the spool and again forms an abutment or stop for the grain.

The different steps of the binding and tying processes are shown in Figs. 8 to $8^4$.

This machine is comparatively simple in construction, is durable and effective in use, and can be manufactured at a small cost, greatly less than the machine now ordinarily employed.

It is evident that numerous changes in the construction and relative arrangement of parts might be resorted to without departing from the spirit of my invention, and hence I would have it understood that I do not confine myself to the exact construction shown and described, but consider myself at liberty to make such changes and alterations as fairly fall within the spirit and scope of my invention.

I make no claim in this application to the peculiar construction of rake shown and described, but reserve the right to claim the same in a subsequent application.

Having fully described my invention, what I claim as new, and desire to secure by Letters Patent, is—

1. In a grain-binder, the combination, with raking, binding, and packing mechanism, of devices for operating the raking and binding mechanism while the packing mechanism is idle, and devices for operating the packing mechanism while the raking and binding mechanisms are idle.

2. The combination, with suitable binding mechanism, packers, and a hinged butt-board adapted to strike or operate against the butts of the grain, of mechanism for operating the butt-board and packers while the binding mechanism is idle, and mechanism for operating the binding mechanism when the other parts are idle.

3. The combination, with a crank-shaft and a series of packers operated thereby, of a butt-board provided with a laterally-projecting arm, $G^2$, and the pitman $G^4$, connecting said arm to the crank-shaft.

4. The combination of two horizontal crank-shafts connected together by links, and one provided with a cranked end, depending packing-fingers secured to said links, a hinged butt-board, and a pitman connecting said board to said cranked end, substantially as and for the purpose set forth.

5. The combination, with suitable packing and binding mechanisms, of a vertical shaft having loose driving-wheels thereon, a clutch or sleeve secured on said shaft, a spring for moving the clutch toward one driving-wheel, and a lever for moving it toward the other.

6. The combination, with suitable packing and binding mechanisms, of a driving-shaft having loose gear-wheels provided with hubs with clutch-teeth, a sleeve or clutch provided at opposite ends with teeth adapted to engage the teeth on the hubs of the driving gear-wheels, a spring for forcing the clutch or sleeve in engagement with one of the gear-wheels, a lever for forcing it in engagement with the other wheel, and a rigid finger engaging the collar on the sleeve for the purpose of holding said sleeve in engagement with the last-mentioned wheel.

7. The combination, with suitable knot-tying mechanism, of a shaft provided at one end with a pinion, a needle secured to said shaft, a shaft situated under the needle-shaft and provided with a pinion, a compressor-arm secured on said last-mentioned shaft, the double sector for simultaneously moving the needle and compressor-arm, and devices for moving the double sector.

8. The combination, with the needle, compressor-arm, and double sector for operating the needle and compressor-arm, of a vibrating lever, the inner end of which is pivotally secured to the machine-frame and the opposite end connected to the double sector, and a cam-wheel for vibrating the lever.

9. The combination, with the needle, compressor-arm, and double sector, of a vibrating lever the inner end of which is pivotally secured to the machine-frame while the opposite end is connected to the double sector, a combined gear-and-cam wheel for vibrating the lever and transmitting the motion of the driving-shaft to the knot-tying mechanism, and a chain-wheel secured to the lower end of the shaft of the combined gear-and-cam wheel for operating the rake.

10. The combination, with the combined gear-and-cam wheel, the lever, and the double sector for operating the needle and compressor-arm, of a second gear-and-cam wheel journaled in the machine-frame, and a vibrating lever connected therewith for operating the cord cutter and holder of the binding mechanism.

11. The combination, with the combined gear-and-cam wheel, a lever engaging the cam for operating the needle and compressor-arm, a similarly-shaped gear-and-cam wheel, and a vibrating lever engaging the cam thereof for operating the cord cutter and holder of the binding mechanism, of a cam-wheel rigidly secured to the shaft of the last-mentioned gear-and-cam wheel, and a lever engaging therewith for operating the cord-guiding arm.

12. The combination, with the cam-wheel the periphery of which is provided with a cut-away portion and a toothed portion or segment-rack above the cut-away portion, of the ejector-actuating shaft provided with a shoe and pinion, and the tying-shaft provided with a shoe and pinion, all of the above parts combined and adapted to operate as described.

13. The combination, with the cam-wheel the periphery of which is provided with a cut-away portion and a toothed portion or segmental rack above the cut-away portion, of a vibrating lever engaging the cam-groove in said wheel and adapted to operate a cord-guiding arm, the knot-tyer shaft provided with a delay-shoe adapted to bear against the smooth periphery of the wheel, a pinion engaging the segment-rack, and the ejector-actuating shaft provided with a similar shoe and pinion, substantially as and for the purpose set forth.

14. The combination, with a smooth wheel having a cut-away portion and a segment-rack above the cut-away portion, of the knot-tyer shaft and ejector-actuating shaft situated on opposite sides of the wheel, each shaft being provided with a pinion adapted to be engaged by said segment-rack, whereby the shaft is revolved, and a shoe for holding the shaft immovable after the pinion has been turned by the rack.

15. The combination, with the vertical shaft $p^{10}$, provided at its upper end with a crank, of the ejector pivotally secured to the frame of the machine, and the pitman $p^9$, connecting said ejector and crank.

16. The combination, with the vertical shaft $p^{10}$, having a cranked upper end, and a pinion secured to its lower end, said pinion adapted to mesh with the segment-rack on the wheel P', an ejector adapted to rest under the platform, and a pitman connecting said crank-shaft and ejector, of a compressor-arm adapted to form an abutment for the grain, and mechanism for lowering said compressor-arm simultaneously with the upward movement of the ejector.

17. The combination, with the wheel P', of the ejector-actuating shaft having a pinion and delay-shoe on its lower end, an ejector, and a pitman connecting the ejector and shaft.

18. The combination, with the knot-tyer shaft having a pinion on the lower end thereof, of the gear-and-cam wheel P', the lever $v^2$ engaging the cam in said wheel, the cord-guiding arm, and the pitman $v^4$, connecting said arm and lever, substantially as set forth.

19. The combination of a suitable tying-bill, a cord-guiding arm, a sliding cord holder and cutter, a wheel, P', for operating the bill and guiding-arm, and a finger secured to the sliding cord holder and cutter and adapted to carry the cord under the tying-bill after the cord-guiding arm has brought it within reach.

20. The combination of the tyer-shaft having a jaw at its upper end, means for revolving said shaft, a vertically-movable sleeve mounted on said shaft and provided with a jaw, means for moving the sleeve up and down, the cord-guiding arm Q, the lever $v^2$, and a suitable cam-wheel for vibrating the lever and operating the cord-guiding arm.

21. The combination, with the revolving tyer-shaft having a jaw at its upper end and a pinion at its lower end, and a vertically-movable sleeve also provided with a jaw, of the cord-guiding arm, the wheel P' for operating the tying-bill and guiding-arm, and the finger $R^3$, all of the above parts combined and adapted to operate as described.

22. The combination, with the tying-jaws and mechanism for moving the lower one, of the plate R, having an open slot, one side of which forms a cord-cutting blade, and the movable cord-cutting blade and cord-holding jaw, the latter being situated below the cutter.

23. The combination, with the plate R, having an open slot, one side wall of which forms a cutting-blade, of the movable plate having an L-shaped blade connected thereto, and a cord-holding jaw situated below the cutting-blade, all of the above parts combined and adapted to operate as described.

24. The combination, with the plate R, having an open slot, one side wall of which forms a cutting-blade, and a second plate rigidly secured to the plate R and provided with grooves, of a movable plate held in position between the two rigid plates and provided with a curved finger for carrying the cord under the tying-bill, a cutting-blade adapted to act in conjunction with the rigid cutting-blade, and a cord-holding jaw adapted to clamp the free end of the cord between it and the grooved plate.

25. The combination of the plate R, provided with an open slot, one side wall of which forms a cutting-blade, a second plate rigidly secured to the plate R, the tying-jaws, devices for lowering and raising the lower jaw, and the movable plate provided with a curved cord-carrying finger, a cutting-blade, and a cord-holding jaw.

26. The combination of the tying-bill, the bell-crank, the plate R, having the open slot, one side wall of which forms a cutting-blade, and the movable plate provided with the curved cord-carrying finger, the L-shaped cutting-blade, and cord-holding jaw, all of the above parts constructed, combined, and adapted to operate as described.

In testimony whereof I have signed this specification in the presence of two subscribing witnesses.

ALVIN O. CARMAN.

Witnesses:
RICHARD CARMAN,
JACOB JACKLE.